July 23, 1957   J. J. RILEY   2,800,611
HALF-CYCLE TIMER FOR ELECTRIC RESISTANCE WELDING APPARATUS
Filed March 3, 1955
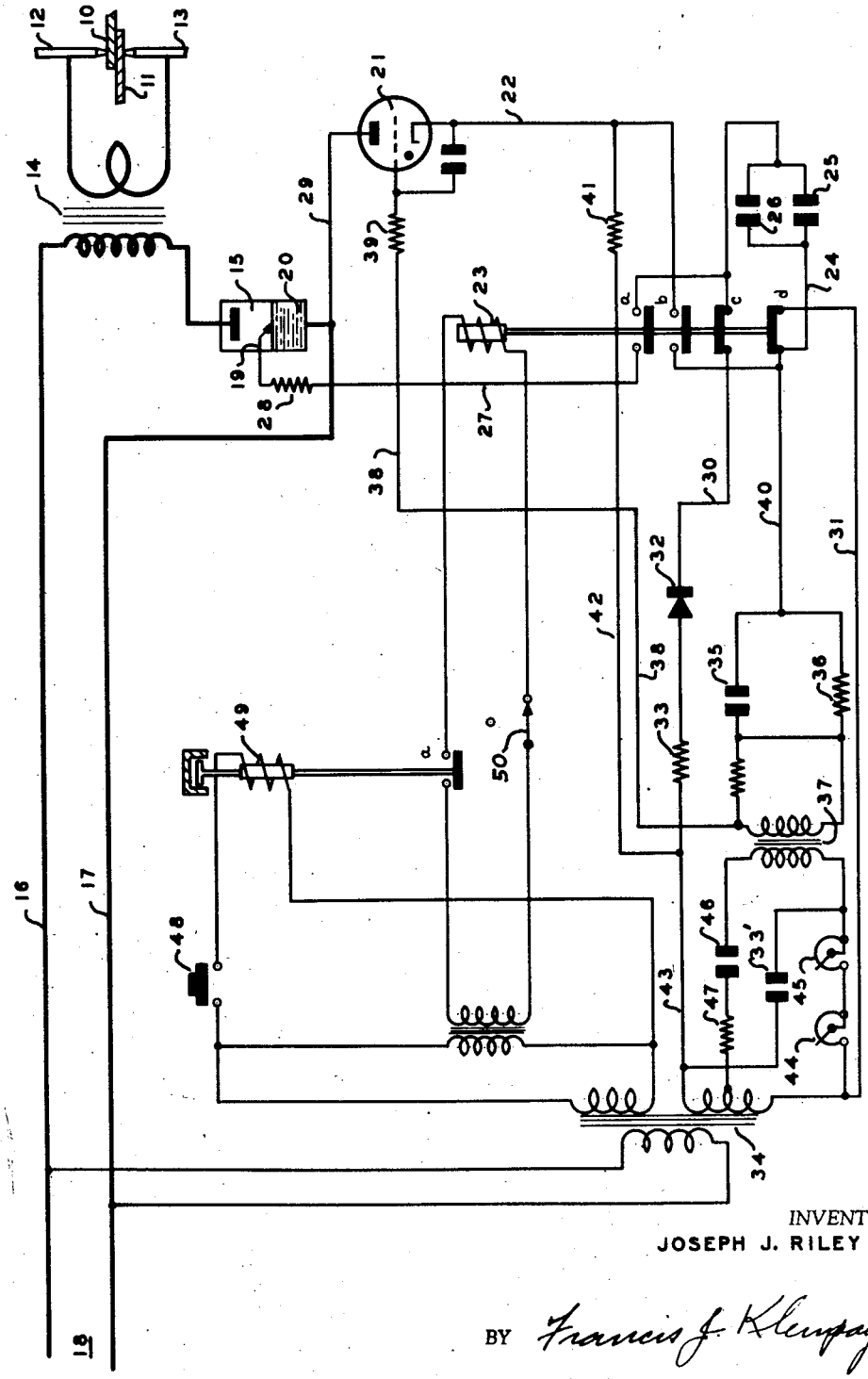
INVENTOR
JOSEPH J. RILEY
BY *Francis J. Klempay*
ATTORNEY United States Patent Office 2,800,611
Patented July 23, 1957

2,800,611

HALF-CYCLE TIMER FOR ELECTRIC RESISTANCE WELDING APPARATUS

Joseph J. Riley, Warren, Ohio, assignor to The Taylor-Winfield Corporation, Warren, Ohio, a corporation of Ohio Application March 3, 1955, Serial No. 491,870

3 Claims. (Cl. 315—204)

The present invention relates to the art of electric resistance welding and heating, and more particularly to an improved and simplified timing and control circuit for use in connection with such apparatus.

As an overall object, the present invention seeks to provide a novel and improved timing and control circuit for electric resistance welding apparatus which is adapted to accurately measure and control the quantity of energy or current flowing through the welding apparatus in the performance of a welding operation.

More specifically, it is an object of the invention to provide a novel simplified control circuit for electric resistance welding apparatus which is adapted to pass at any one time a single half cycle of welding energy, or some predetermined fraction of such half cycle.

Of course, half-cycle timers, as such, are old in this and other related arts. However, it is the essence of this invention to provide a timer of this general type which is improved and simplified throughout to simplify maintenance problems and to render the equipment suitable for low cost manufacture.

A more specific object of the invention is the provision in a half-cycle timer circuit of novel switching or valving arrangement comprising a primary electronic valve or ignitron device, a secondary electronic valve for firing the primary valve, and a capacitor-powered anode-cathode circuit system for the secondary valve for predetermining the duration of conduction therein.

In connection with the above, it is a further object of the invention to provide in a circuit as described generally above a novel arrangement for predetermining the exact point in the sinusoidal anode-cathode potential wave that the secondary or firing valve will begin to conduct. In this manner, while I may provide for full half-cycle conduction in the primary valve, I may also provide for conduction only during preselected fractional portions of a cycle, depending upon the characteristics of the work to be welded.

Yet another object of the invention resides in the provision of a circuit of the type and for the purpose above set forth which incorporates a minimum number of electronic valves or discharge devices, and also a minimum number of relays and other devices which are subject to failure after long periods of use.

The above and other objects and advantages of the invention will become apparent upon full consideration of the following detailed specification and accompanying drawing wherein is illustrated a certain preferred embodiment of my invention.

The sole figure of the drawing is a simplified schematic representation of an electrical control circuit incorporating the teachings of my invention, the circuit being illustrated in its operative relation with an electric resistance welding apparatus.

Referring now to the drawing, the numerals 10 and 11 represent overlapped workpieces in position for welding. Engaging opposite surfaces of the workpieces 10 and 11 are welding electrodes 12 and 13 connected respectively to opposite terminals of the secondary winding of a conventional welding transformer 14. The primary winding of welding transformer is connected through a mercury arc type electronic discharge valve 15 and conductors 16 and 17 to a source of welding energy, generally indicated by the reference numeral 18. The energy source 18 provides an alternating potential across the terminals of the valve 15, which may be considered as the "primary" valve, so that when the anode electrode of valve 15 alternately becomes positive with respect to its cathode the valve is conditioned for conduction, and will conduct when properly initiated or "fired."

In order to initiate or fire the primary valve 15 the same is provided with a starter electrode 19 which is in contact with mercury pool 20 so that when current is caused to flow between the pool 20 and starter electrode 19 the mercury is caused to ionize, and the valve will immediately conduct, assuming the anode-cathode potential to be properly applied at such time.

For the purpose of causing current to pass from the mercury pool 20 to the starter electrode 19 there is provided a gaseous or thyratron type discharge device 21, the anode of which is connected to the cathode of the primary valve 15 and the cathode of which is connected to the starter electrode 19 of the valve 15. When the valve 21, which may be referred to as the "secondary" valve, is caused to conduct a completed circuit is established through the pool 20 and starter electrode 19 to ionize the mercury in the manner desired.

In accordance with the teachings of my invention, the anode-cathode circuit for the secondary valve 21 includes conductor 22, normally open contacts 23b of a relay 23, conductor 24, power capacitors 25 and 26, normally open contacts 23a, conductor 27, resistor 28, electrode 19, pool 20 and conductor 29. It will thus be observed that the secondary valve 21 is normally isolated and non-conducting. The anode-cathode circuit therefor is always open, except during such times as the relay 23 may be energized and the contacts 23a and 23b thereof closed. There is thus no possibility of improper or untimely initiation of conduction in de-energization of the relay 23, as will be readily apparent.

Connecting with the opposite terminals of capacitors 25 and 26, through normally closed contacts 23c and 23d, and conductors 30 and 31 is a direct current generating circuit comprising a rectox unit 32, resistor 33 and the secondary winding of a power transformer 34. The arrangement is such that during periods of deenergization of the relay 23, capacitors 25 and 26 become charged, with the left hand terminals thereof, connecting the cathode of secondary valve 21, assuming a negative potential. Subsequently, when relay 23 is energized, contacts 23c and 23d open, to prevent further charging of capacitors 25 and 26, and contacts 23a and 23b close to connect the power capacitors 25 and 26 across the principal electrodes of valve 21. The valve may at this time fire to initiate the primary valve 15, subject to any blocking bias potential which may be applied to the control grid of valve 21.

In accordance with the teachings of the invention the power capacitors 25 and 26 are of such a size or capacity value that when the secondary valve 21 conducts the charge is quickly drained or dissipated. The arrangement is such that conduction is sustained in the secondary valve 21 for a relatively short interval, and in any event not substantially longer than a full half cycle. However, once the primary valve 15 begins to conduct it will continue to so conduct throughout the whole of the positive half cycle of applied anode-cathode potential, notwithstanding that the initiating or controlling valve 21 may have ceased to conduct at some prior time.

In order to properly control the firing of secondary valve 21 there is provided a control grid circuit including a capacitor-resistor time delay network 35—36, connecting the lower terminal of the secondary winding of a control transformer 37, the upper terminal of such secondary winding connecting the grid electrode of valve 21 through conductor 38 and current limiting resistor 39. This circuit is referenced to the cathode of valve 21 through conductor 40, normally open contacts 23b and conductor 22, so that whenever anode-cathode voltage is applied to the valve 21 the control grid circuit is also operatively connected in the system.

Capacitor 35 functions as a timing capacitor, and is incorporated in the illustrated circuit for the purpose of interposing a predetermined delay period following energization of realy 23 before valve 21 begins to conduct.

In order to provide an initial timing charge upon the capacitor 35 one termnial of the same is connected to the lower terminal of power transformer 34, through conductors 40 and 31, and normally closed contacts 23d. The other terminal is connected through transformer 37 and current limiting resistor 39 to the control grid electrode of the secondary valve 21. And through conductor 22, resistor 41 and conductors 42 and 43 the cathode of valve 21 is connected to the upper terminal of power transformer 34. The arrangement is such that when the control relay 23 is in a deenergized condition there is a grid rectification circuit provided through the valve 21 so that capacitor 35 becomes charged, with the left hand terminal thereof negative with respect to the right hand terminal, and thus with respect to the cathode of valve 21.

When relay 23 is energized at the start of a welding operation contacts 23d thereof open to break the grid rectification circuit and cause the capacitor 35 to begin discharging through resistor 36. Thus, for a predetermined period, while capacitor 35 is discharging, valve 21 is held in a non-conductive status even though the anode-cathode circuit thereof is completed.

Eventually the timing capacitor 35 discharges sufficiently so that valve 21 conducts, obtaining a momentary anode-cathode potential from the charged power capacitors 25 and 26, and causing current to flow to the starter electrode 19 to initiate the primary valve 15.

As heretofore explained, the charge upon capacitors 25 and 26 is such that conduction is sustained in valve 21 for only a short period of time so that if the primary valve 15 is caused to conduct during one half-cycle potential wave, the secondary valve has been extinguished prior to the next similar potential wave, insuring that not more than one half cycle of energy is applied to the welding transformer 14 and electrodes 12 and 13.

As will be understood, the power capacitors 25 and 26, furnishing anode-cathode potential for secondary valve 21, constitute a direct current power source, so that the timing control afforded by capacitor 35 will not by itself insure that the firing of valve 21 is properly synchronized or in predetermined phased relation with the anode-cathode potential wave of the primary valve 15. Thus, there is included in series in the control grid circuit for valve 21 a control transformer 37, the primary winding of which connects with the secondary winding of transformer 34. The latter transformer is connected directly across the main power lines 16 and 17, and is thus furnished with power which is in synchronous phase relationship with the anode-cathode potential of the primary valve 15.

Included in the circuitry connecting transformers 34 and 37 are series connected adjustable potentiometers 44 and 45 and capacitor 33', these last mentioned elements constituting a phase shifting circuit or network so that the potential applied to transformer 37 may be varied in phase relationship with respect to the line voltage across valve 15.

Capacitor 46 and resistor 47 are connected in series with the primary of transformer 37 so that the secondary voltage thereof may be properly tuned or phased with respect to the line voltage. This merely corrects or compensates for certain inherent lagging characteristics of the transformer 37.

Thus, there is superimposed upon the control bias potential provided by timing capacitor 35 an alternating potential voltage which has a definite predetermined phase relationship with the main line voltage, which phase relationship may be varied by appropriate manipulation of potentiometers 44 and 45.

As the capacitor 35 times out, drawing the control bias potential on valve 21 down to or near a critical value at which the valve will begin to conduct, the superimposed alternating signal applied through transformer 37 is effective to cause the valve 21 to conduct at an exact predetermined point in the line voltage cycle. For example, in order to effect full half-cycle conduction in the main or primary valve 15 the phase-adjustable signal from transformer 37 is caused to swing the grid potential of valve 21 past the critical hold-off voltage as or just before the anode of valve 15 becomes positive. The latter valve will then conduct immediately, and will continue to conduct through the whole of the positive half cycle even though valve 21 has previously ceased to conduct.

Where fractional half-cycle conduction in the primary valve 15 is desired the potentiometers 44 and 45 are adjusted so that the grid of valve 21 swings past the critical voltage level some predetermined time subsequent to the instant at which the anode of valve 15 turns positive. Thus, valve 15 may be held non-conductive throughout a predetermined portion of the positive half cycle.

To initiate the circuit as a whole a switch 48 is closed to apply energy to the cathode heater circuit, not shown, for valve 21, and to energize time delay relay 49. After a delay period sufficient to allow valve 21 to warm up, contacts 49 close. Thereafter, closing of start switch 50 will initiate a welding operation by closing relay 23.

Of course, it will be understood, that switches 48 and 50 are merely representative, and the illustrated circuit may be incorporated in a comprehensive sequencing circuit having electronic means arranged at some point in the sequencing cycle to cause the automatic energization of relay 49 and/or relay 23.

It should thus be apparent that I have fulfilled the objects initially set forth. My circuit is of a highly simplified and inexpensive nature, involving only two discharge devices or tubes, while being accurate and essentially fool proof in operation.

One of the advantageous features of the invention resides in the use of a capacitor-powered secondary control valve for firing main valve or ignitron device. This affords a simplified and dependable arrangement for insuring that conduction in the main valve will not extend over more than a half-cycle period. Ordinarily, the anode-cathode circuit is open so that accidental triggering thereof is precluded; and when such circuit is closed the entire power voltage is derived from charged capacitors which no longer are connected with the charging circuit therefor.

Another novel and advantageous feature is the provision of a timing and controlling circuit comprising a grid rectification circuit for charging the timing capacitor only when the anode-cathode circuit for valve 21 is in an open condition, and having superimposed phase shifted signal means for synchronizing the firing of the secondary valve 21 with the applied anode-cathode wave for the main valve 15. The arrangement is such that capacitor 35 begins to time out after anode-cathode potential is applied to valve 21, and after a predetermined time the synchronized superimposed signal causes the valve to fire. This in turn causes valve 15 to fire at an exact predetermined point in its voltage cycle, which point may be accurately adjusted by regulating the phase relation of the superimposed signal.

It should be understood, however, that the within described circuit is intended to be representative only, since many changes and alterations may be made therein without departing from the clear teachings of the invention. Reference should therefore be had to the following appended claims in determining the full scope of the invention.

I claim:

1. In a half-cycle power circuit for welding apparatus and the like the combination of an alternating power source, a mercury arc type primary discharge device valve connected to said source, said primary valve having a starter electrode element, a gaseous type secondary discharge valve having an anode, a cathode and a control grid electrode connected in series with said starter electrode and adapted upon conduction to condition said primary valve for conduction, a power capacitor connected in series with said secondary valve through normally open contacts of a relay, a charging circuit for said power capacitor, said power capacitor connected with said charging circuit through normally closed contacts of said relay, a timing capacitor adapted to be connected by normally open contacts of said relay in series with said cathode and said control grid electrode, a charging circuit for said timing capacitor, and meals for superimposing an electrical signal having a predetermined phase relation with respect to said alternating current source across said capacitor, the arrangement being such that said secondary valve is effectively isolated from said timing and power capacitors when said relay is in normal position but when said relay is energized said secondary valve is caused to conduct at a predetermined time during a given half cycle of said alternating current source.

2. Apparatus according to claim 1 further characterized in that said charging circuit for said timing capacitor comprises said cathode and said control grid of said secondary valve and normally closed contacts of said relay whereby said timing capacitor is charged by grid rectification.

3. In a half-cycle power circuit for welding apparatus and the like the combination of an alternating power source, a mercury arc type primary discharge device valve connected to said source, said primary valve having a starter electrode element, a gaseous type secondary discharge valve having an anode, a cathode and a control grid electrode connected with said starter electrode and adapted upon conduction to condition said primary valve for conduction, a power circuit adapted to be inserted in series with the anode and cathode of said secondary valve to supply firing potential therefor, a timing capacitor adapted to be connected in series with said cathode and said control grid of said secondary valve through normally open contacts of a relay, a charging circuit for said timing capacitor including normally closed contacts of said relay and said cathode and said control grid electrode of said secondary valve whereby said capacitor is charged by grid rectification, and means to initiate conduction of said secondary valve comprising means to superimpose an electrical signal having a predetermined phase relation with respect to said alternating source between said cathode and said control grid of said secondary valve.

References Cited in the file of this patent

UNITED STATES PATENTS

| | | |
|---|---|---|
| 2,446,533 | England | Aug. 10, 1948 |
| 2,494,747 | Drugmond | Jan. 17, 1950 |